United States Patent
Osuga

(10) Patent No.: US 10,200,263 B2
(45) Date of Patent: Feb. 5, 2019

(54) DATA TRANSMISSION DEVICE, DATA TRANSMISSION METHOD, AND PROGRAM THEREFOR

(71) Applicant: NEC Corporation, Minato-ku, Tokyo (JP)

(72) Inventor: Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 326 days.

(21) Appl. No.: 14/784,372

(22) PCT Filed: Apr. 18, 2014

(86) PCT No.: PCT/JP2014/061091
§ 371 (c)(1),
(2) Date: Oct. 14, 2015

(87) PCT Pub. No.: WO2014/171543
PCT Pub. Date: Oct. 23, 2014

(65) Prior Publication Data
US 2016/0057037 A1 Feb. 25, 2016

(30) Foreign Application Priority Data
Apr. 19, 2013 (JP) .................................. 2013-088052

(51) Int. Cl.
*H04L 12/26* (2006.01)
*H04W 28/10* (2009.01)
(52) U.S. Cl.
CPC ...... *H04L 43/0829* (2013.01); *H04L 43/0835* (2013.01); *H04W 28/10* (2013.01)
(58) Field of Classification Search
None
See application file for complete search history.

(56) References Cited

U.S. PATENT DOCUMENTS

2005/0286416 A1* 12/2005 Shimonishi ........... H04L 1/1671
370/229
2006/0171313 A1* 8/2006 Shimonishi ........... H04L 1/1874
370/229
(Continued)

FOREIGN PATENT DOCUMENTS

JP 2004-254258 A 9/2004
JP 2006-279730 A 10/2006
(Continued)

OTHER PUBLICATIONS

Lawrence S. Brakmo et al., "TCP Vegas: New Techniques for Congestion Detection and Avoidance", Computer Communication Review, Oct. 1994, pp. 24-35, vol. 24, No. 4.
(Continued)

*Primary Examiner* — Rebecca E Song

(57) ABSTRACT

To provide a data transmission device for effectively improving throughput (transmission efficiency) regardless of whether a physical bandwidth in a network varies frequently; the data transmission device for transmitting data to a user terminal via a network and controlling subsequent transmitting operations by correlating delay of a packet pertaining to this transmission with network information includes: a variation detection circuit that detects, on the basis of the delay and the network information, that a minimum value of the delay has increased; and an alteration processing circuit that calculates, when the increase is detected by the variation detection circuit, the increased minimum delay value by using data pertaining to a specific packet, and updating a current minimum delay value with the calculated value.

19 Claims, 8 Drawing Sheets

(56) References Cited

U.S. PATENT DOCUMENTS

| | | | |
|---|---|---|---|
| 2006/0215669 A1* | 9/2006 | Gangadharan | H04L 43/087 370/401 |
| 2007/0018708 A1* | 1/2007 | Yoo | H04L 47/10 327/261 |
| 2011/0013618 A1* | 1/2011 | Wu | H04L 12/66 370/352 |
| 2012/0027146 A1* | 2/2012 | Hodge | H04J 3/0664 375/356 |
| 2014/0173090 A1* | 6/2014 | Davis | H04L 43/0852 709/224 |

FOREIGN PATENT DOCUMENTS

| | | |
|---|---|---|
| JP | 2008-193335 A | 8/2008 |
| JP | 2011-035700 A | 2/2011 |

OTHER PUBLICATIONS

Cheng Jin et al., "Fast TCP: Motivation, Architecture, Algorithms, Performance", IEEE Inforcom, Mar. 2004, pp. 2490-2501, Hong Kong.

Ryo Yamamoto et al., "Flow Control Method Using Round Trip Time on Ad Hoc Networks," Institute of Electronics, Information and Communication Engineers Technical Report. NS, Network System, Dec. 2008, pp. 95-100, vol. 108, No. 359, Japan, English Abstract.

International Search Report of PCT Application No. PCT/JP2014/061091 dated Jul. 22, 2014.

English translation of Written opinion for PCT/JP2014/061091.

U.S. Office Action for U.S. Appl. No. 14/784,372 dated Aug. 28, 2017.

Mo et al., "Analysis and Comparison of TCP Reno and Vegas", IEEE INFOCOM' 99. Conference on Computer Communications. Proceedings. Eighteenth Annual Joint Conference of the IEEE Computer and Communications Societies, 1999, pp. 1556-1563 (2 pages) Online—URL: https://ieeexplore.ieee.org/document/752178/.

Communications dated Jul. 3, 2018, from Japanese Patent Office in counterpart application No. 2015-512541.

Sasaki et al., "A Technique of Adaptive Bandwidth Estimation for SACK Based TCP over Wireless Networks", Institute of Electronics, Information and Communication Engineers, Oct. 2004, vol. J87-B, No. 10, pp. 1657-1667.

Wada et al., "The improving method of TCPWeswood in Wireless Networks", Institute of Electronics, Information and Communication Engineers 2004 synthesis convention lecture collected papers Communication 2 B-7-4, Institute of Electronics, Information and Communication Engineers, 2004, p. 213.

Communication dated Jan. 23, 2018 from the Japanese Patent Office in counterpart Application No. 2015-512541.

* cited by examiner

Fig.7 is added as show below it.
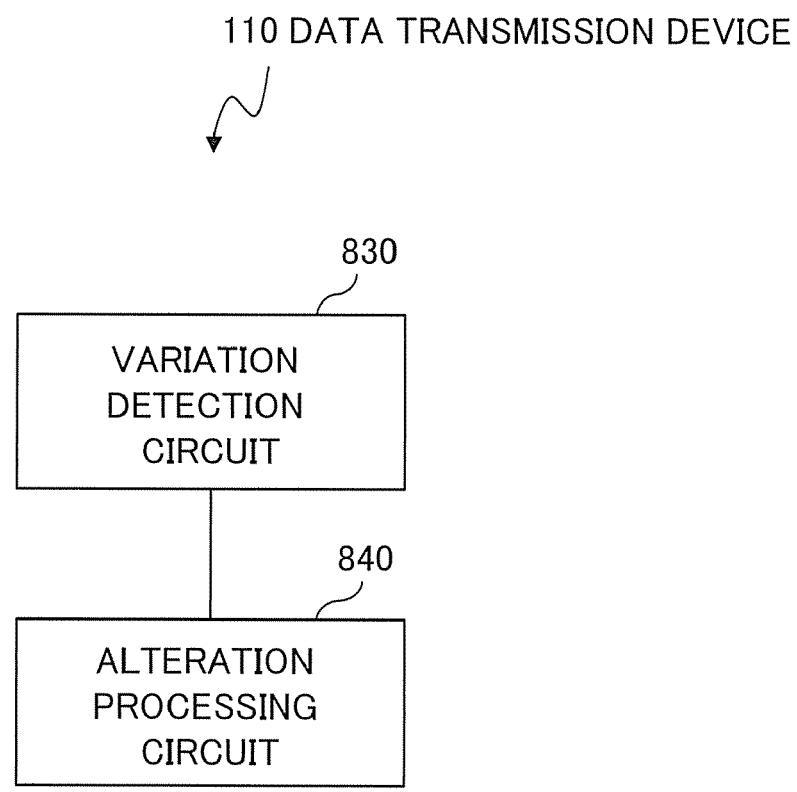

Fig. 8 is added as show below it.
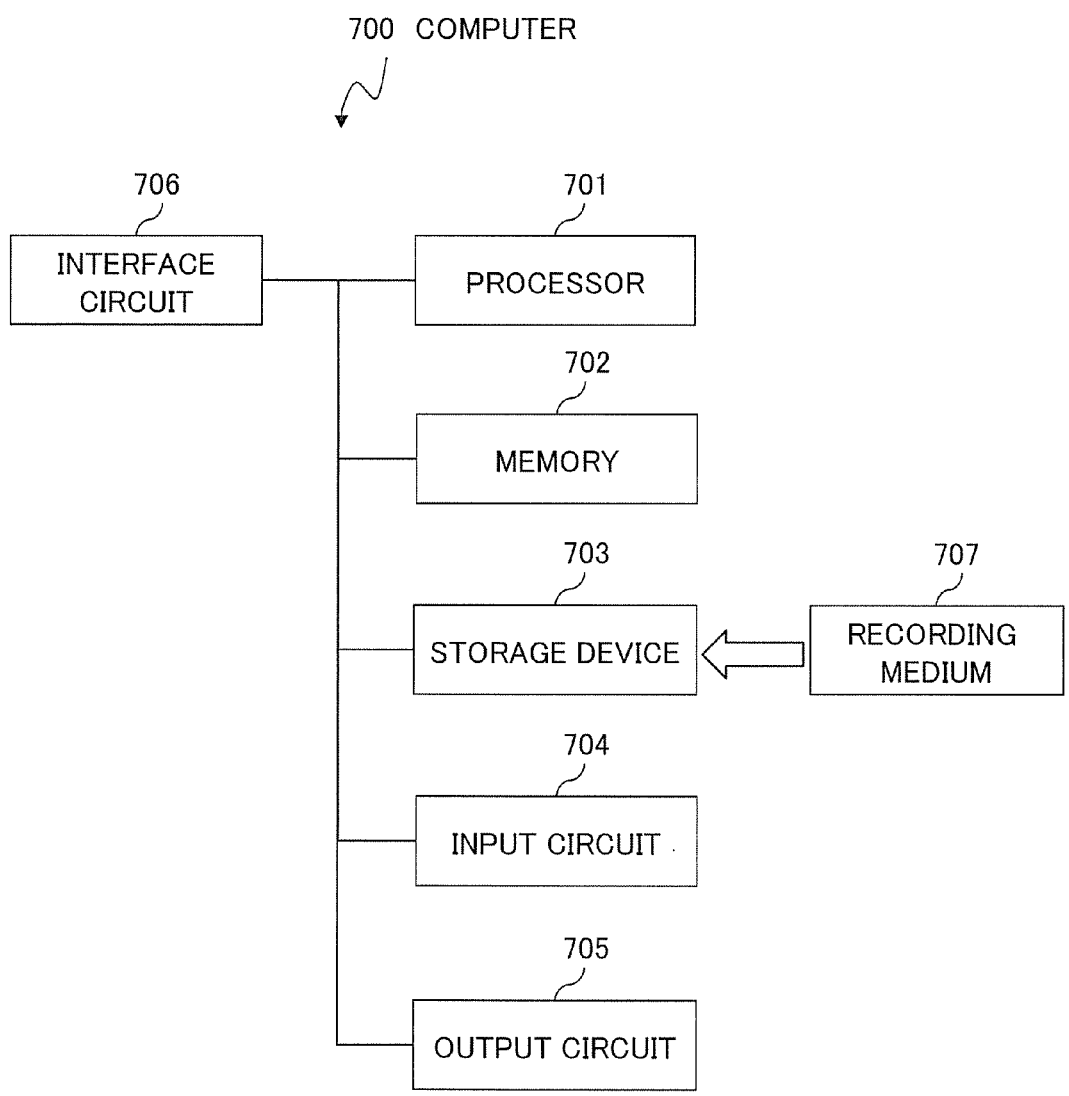

DATA TRANSMISSION DEVICE, DATA TRANSMISSION METHOD, AND PROGRAM THEREFOR

CROSS-REFERENCE TO RELATED APPLICATIONS

This is a national stage of International Application No. PCT/JP2014/061091 filed Apr. 18, 2014, claiming priority based on Japanese Patent Application No. 2013-088052 filed Apr. 19, 2013, the entire contents of which are incorporated herein by reference.

TECHNICAL FIELD

The present invention relates to a network technique, particularly, relating to a data transmission device, a data transmission method, and a program therefor, which realize effective traffic control.

BACKGROUND ART

Recently, with improvement in the line capacity of the Internet and development of elemental technology that deals with a variety of media information, we have come to enjoy information distribution of rich media using mobile terminals at anytime and anywhere. Since such a life style is widely accepted, as a high-speed mobile environment that supports the information distribution, a communication environment such as LTE (Long Term Evolution), is spread and expanding.

In this high-speed mobile communication environment, such as LTE, various techniques for increasing efficiency of data communications are introduced in the protocols of respective layers.

For example, in LTE, by OFDMA (Orthogonal Frequency Division Multiple Access) technique, a resource block consisting of 12 channels is subdivided by one millisecond and an arbitrary plurality number of subdivisions are flexibly allocated to respective user terminals. As such, in LTE, a high-speed wireless access environment is provided by effectively using limited frequency bands.

Further, in the link adaptation technique of LTE, a data modulation method can be flexibly altered according to a distance from eNodeB (an LTE wireless base station) to a user terminal, electric power, and the like. For example, in the link adaptation technique, the modulation method can be flexibly altered, ranging from QPSK (Quadrature Phase-Shift Keying) that is less susceptible to noise and interference to 64QAM (Quadrature Amplitude Modulation) that can transmit a lot of data by a single symbol. Thus, the link adaptation technique of LTE attempts to balance the performance and quality of communications by alteration of the modulation method.

In other words, according to the allocation of resource blocks and the link adaptation technique in a high-speed mobile communication environment, a wireless channel where frequency bands and radio field intensity are limited can be effectively used so as to provide a high-speed wireless access environment.

However, since the above-described respective techniques have technical contents of dynamically altering network resources that can be used by respective user terminals, there is inconvenience of highly frequently varying physical bands that have rarely varied in conventional techniques.

In TCP (Transmission Control Protocol) that has long been widely used in both wired or wireless data communications, a technique relating to a congestion control is advanced so as to cater to recent communication environments where a lot of traffics coexist.

In connection with this, delay-based TCP, represented by TCP Vegas (NPL 1), FAST TCP (NPL 2), can suppress a data transmission rate before a packet loss occurs by detecting congestion by analyzing the state of increased delay. In this way, such delay-based TCP can stabilize throughput without corrupting the network.

As other relating techniques, for example, the following technical contents (PTL 1 or 2) are known.

PTL 1 discloses a technical content where a mean relative delay increasing rate and a packet loss rate are calculated based on pre-generated statistical information, whereby occurrence of congestion is detected by comparing the mean relative delay increasing rate and packet loss rate with preset thresholds, as well as, a data reception rate is controlled based on this detection result.

Further, PTL 2 discloses a streaming device that sets a threshold according to a data distribution condition based on history information of reciprocating delay time that is measured upon a bit rate rise trial in the past and controls a bit rate based on the threshold. That is, this streaming device employs a technique in which a bit rate is controlled by detecting an appropriate threshold range based on history information of whether data could have been distributed with the raised bit rate, as well as, adjusting the threshold in levels within the range.

CITATION LIST

Non Patent Literature

NPL1: L. S. Brakmo, S. O'Malley, and L. L. Peterson, "TCP Vegas: New Techniques for Congestion Detection and Avoidance," Computer Communication Review, vol. 24, no. 4, pp. 24-35, Oct. 1994.
NPL2: C. Jin, D. Wei, and S. Low, "FAST TCP: Motivation, Architecture, Algorithms, Performance," in Proc. of IEEE INFOCOM, Hong Kong, Mar. 2004.

Patent Literature

PTL 1: Japanese Unexamined Patent Application Publication No. 2004-254258
PTL 2: Japanese Unexamined Patent Application Publication No. 2011-035700

SUMMARY OF INVENTION

Technical Problem

However, the delay based TCP that is disclosed in the above-described NPL 1 or 2, controls such that a queue amount that remains in a network is computed (estimated) by a product of an available bandwidth or a transmission rate and a delay increase amount, and, if this computed queue amount exceeds a preset threshold, the congestion state is determined, as well as, the data transmission rate is decreased. As such, even if the increased delay is not attributable to congestion, occurrence of congestion is erroneously recognized, causing inconvenience of unnecessary decreasing the transmission rate.

Further, as described above, in a recent high speed mobile communication network, such as LTE, a physical band frequently varies due to allocation of resources and the like, which causes a phenomenon where a minimum delay value increases, which has hardly occurred in a network.

Here, while a smaller physical band increases an actual minimum delay value, the actual increase cannot be detected, since the minimum delay value (d_min) that is used for computing a queue amount in conventional existing techniques is measured and updated in an upper layer protocol. Thus, a queue amount is erroneously estimated as a larger amount, as the result, causing inconvenience of misrecognizing occurrence of congestion and unnecessarily decreasing a transmission rate.

That is, in the related techniques including the above-described NPL1 or NPL2, there has only been a method of updating a minimum delay value (d_min) only when a value smaller than previous values is observed. As such, the related techniques entail inconvenience in which appropriate update cannot be implemented when a minimum delay value is increased, incapable of achieving improvement of throughput.

Objective of the Invention

The present invention is for improving the inconvenience in the above-described related examples. In particular, the objective of the present invention is to provide a data transmission device, a data transmission method, and a program therefor, which effectively improves throughput (transmission efficiency) regardless of a frequent variation of a physical band in a network.

Solution to Problem

In order to achieve the above objective, the data transmission device of the present invention employs a configuration of:

transmitting data to a user terminal via a network and controls transmission operation by correlating delay of a packet pertaining to this transmission with network information, and comprising:

a variation detection unit that detects an increase in a minimum value of said delay based on said delay and said network information; and an alteration processing unit that, when the variation detection unit has detected said increase, calculates said increased minimum delay value and updates a current minimum delay value with this calculated value.

Further, the data transmission method of the present invention, in the data transmission method of a data transmission device that transmits data to a user terminal via a network and controls transmission operation by correlating delay of a packet pertaining to this transmission with network information, includes:

detecting an increase in a minimum value of said delay based on said delay and said network information;

in this detection, calculating said increased minimum delay value; and updating a current minimum delay value with this calculated value.

Furthermore, the data transmission program of the present invention, in a data transmission device that transmits data to a user terminal via a network and controls transmission operation by correlating delay of a packet pertaining to this transmission with network information, causes a computer that is equipped in advance in the data transmission device to function as:

variation detection means for detecting an increase in a minimum value of said delay based on said delay and said network information;

calculation means for, when the variation detection means has detected said increase, calculating said increased minimum delay value; and update means for updating a current minimum delay value with the calculated value by the calculation means.

Advantageous Effects of Invention

The present invention can particularly provide a data transmission device, a data transmission method, and a program therefor, which can effectively improve throughput (transmission efficiency) even if a physical band frequently varies in a network.

BRIEF DESCRIPTION OF DRAWINGS

FIG. 7 is a block diagram showing a configuration of a data transmission device according to a third exemplary embodiment of the present invention; and FIG. 8 is a block diagram showing a hardware configuration of a computer for implementing the data transmission device according to the third exemplary embodiment.

DESCRIPTION OF EMBODIMENTS

First Exemplary Embodiment

The data transmission device according to the first exemplary embodiment of the present invention will be described with reference to FIGS. 1 and 2.
(Basic Configuration)

First, the basic structure and components of the data transmission device according to the first exemplary embodiment and the surrounding environment thereof will be described with reference to FIG. 1.

Figure 1:
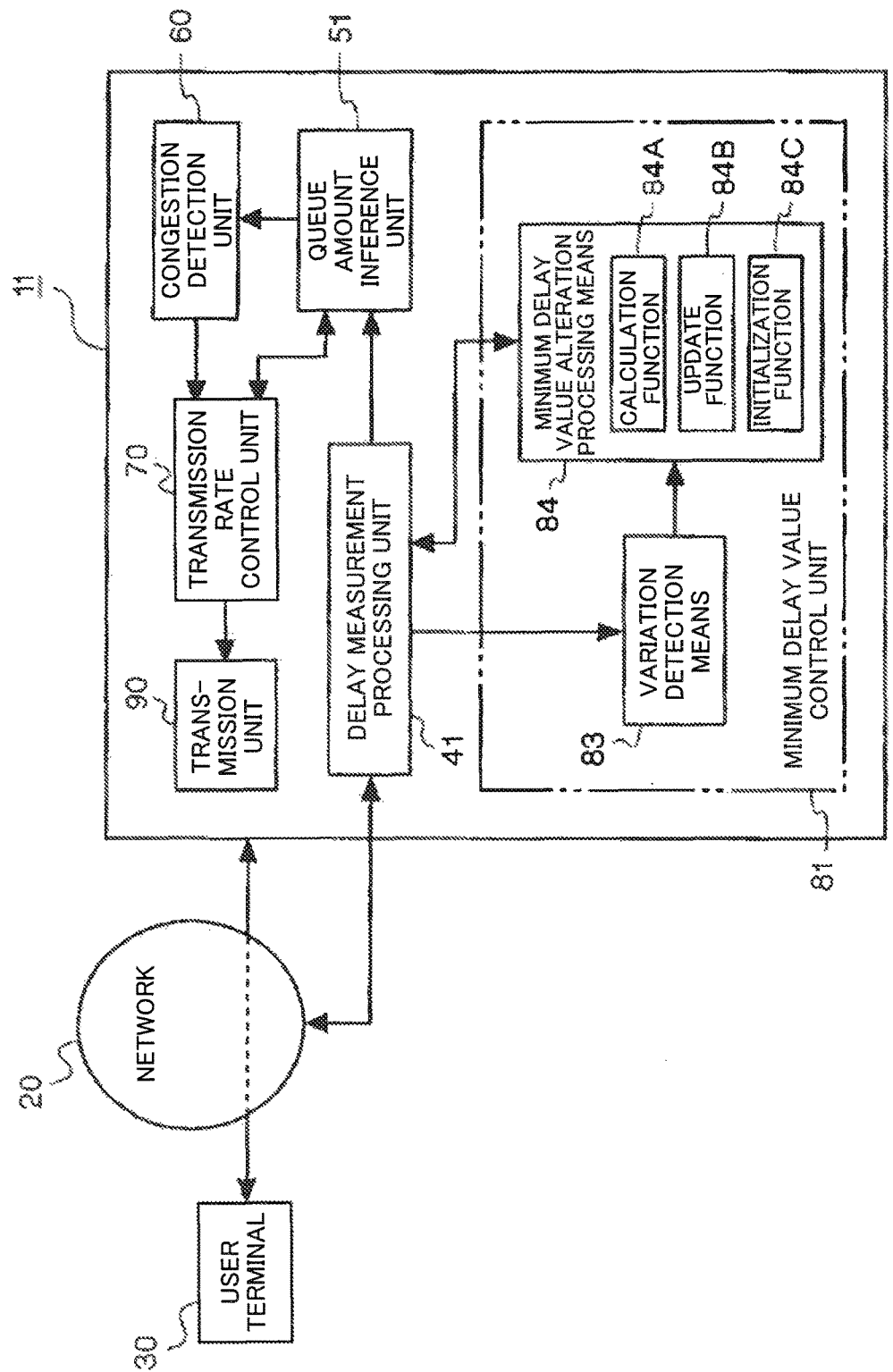
FIG. 1 is a block diagram showing a configuration of a data transmission device according to a first exemplary embodiment of the present invention and the surrounding environment.

As shown in FIG. 1, a data transmission device 11 that transmits data according to a request from outside is provided in a manner connected with a network 20 such as the Internet. The reference sign 30 indicates a user terminal (a request source terminal) that transmits a data acquisition request from a user or the like to the data transmission device 11 via the network 20 to acquire the requested data and corresponds to, for example, a PC (Personal Computer), a mobile terminal and the like. That is, the network 20 functions as a component that connects the user terminal 30 and the data transmission device 11.

As the data transmission device 11, for example, an origin server that retains data requested from a user or a relay server device that is installed in the network 20 and terminates data communications between an origin server and the user terminal 30, such as a cache server, a proxy server, an edge server, or the like, may be employed. Alternatively, as the data transmission device 11, a data communication device that constitutes the network 20, such as a P-GW (Packet Data Network Gateway) and a S-GW (Serving Gateway), may be employed. In any case, the data transmission device 11 is configured to establish a connection, such as TCP, and transmits the requested data to the user terminal 30.

Here, if a relay server device or the like is employed as the data transmission device 11, an origin server may be arranged in the middle of a path for transmitting data to the user terminal 30. Further, another network (not shown) or an origin server and the like (not shown) that retains requested data may be provided behind the data transmission device 11 when seen from the user terminal 30.

That is, the data transmission device 11 is configured as follows. When data acquisition is requested from a user or the like, the user terminal 30 transmits a data request to the data transmission device 11 or the origin server via the network 20. Accordingly, the data transmission device 11 or the origin server distributes the requested data to the user terminal 30. The user terminal 30 presents the data to the user or the like upon distribution of the data.

(Specific Configuration)

Subsequently, the specific structure and components of the data transmission device according to the first exemplary embodiment and the surrounding environment thereof will be described with reference to FIG. 1.

As shown in FIG. 1, the data transmission device 11 that transmits requested data to the user terminal 30 via the network 20 includes a delay measurement processing unit 41, a queue amount inference unit 51, a congestion detection unit 60, a transmission rate control unit 70, a minimum delay value control unit 81, and a transmission unit 90. The delay measurement processing unit 41 measures delay of packet transmission in the network 20 based on the network information and performs storage processing of this measurement value (delay) or a statistical value or the like that is obtained by applying statistical processing thereto, a current minimum delay value, and network information in an internal memory or the like (not shown). The queue amount inference unit 51 infers (estimates) a queue amount that indicates a packet amount that remains in the network 20 upon the measurement based on the delay measured by the delay measurement processing unit 41 and the like. The congestion detection unit 60 detects (determines) the degree of congestion of the network 20 by comparing the queue amount inferred by the queue amount inference unit 51 and a preset threshold. The transmission rate control unit 70 controls a transmission rate of data that is transmitted to the user terminal 30 according to the degree of congestion detected by the congestion detection unit 60. The minimum delay value control unit 81 detects a variation (a change in the minimum value of delay) in the current minimum delay value that is performed storage processing by the delay measurement processing unit 41 and transmits a command signal according to the detection result to the delay measurement processing unit 41. The transmission unit 90 transmits the data to the user terminal 30 according to a preset transmission rate.

That is, the data transmission device 11 transmits data to the user terminal 30 via the network 20 and controls transmission operation thereafter by correlating the packet delay pertaining to this transmission with the network information.

Here, the above-described network information includes, in addition to the preset minimum delay value, transmission time of each packet, the data size of transmission data, transmission time of an acknowledgement packet from the user terminal 30 (time of replying an acknowledgement packet), time of receiving the acknowledgement packet, the data size of the acknowledgement packet, a packet transmission interval of the data transmission device 11, a packet reception interval of the user terminal 30, an available band of the network 20, transmission throughput, and the like. Then, upon the measurement, the delay measurement processing unit 41 acquires necessary information thereamong and performs storage processing thereof.

Further, the above-described current minimum delay value is an initial value of the minimum value of delay (a minimum delay value) that is input from outside or a minimum delay value that has been updated according to a command signal from the minimum delay value control unit 81. That is, the above-described current minimum delay value is the minimum value of delay within a certain time period or during the same transmission session that is performed storage and update processing by the delay measurement processing unit 41 in response to the command signal from the minimum delay value control unit 81.

The acknowledgement packet refers to a so-called ACK (positive response) packet, which will be hereinafter simply referred to as acknowledgement.

Further, delay or a statistical value or the like that is obtained by applying statistical processing thereto, the current minimum delay value, and the above-described network information that are performed storage processing by the above-described delay measurement processing unit 41 are referred to as delay data.

The delay measurement processing unit 41 measures delay that has occurred in transmission and reception of a packet in the network 20 and acquires delay data, when the data transmission device 11 has received acknowledgement for data (a data packet) that was transmitted from the data transmission device 11 to the user terminal 30 or at certain time intervals.

As delay mentioned here, for example, in addition to RTT (Round Trip Time) of a communication between the user terminal 30 and the data transmission device 11 and round trip delay, delay in a single direction from the data transmission device 11 to the user terminal 30 can be employed.

Further, as a delay measurement method by the delay measurement processing unit 41, a method of measuring network information using transmission data and a method of deriving an inferred value by an existing method, such as a method of transmitting a probe packet in addition to the transmission data, may be employed. It should be appreciated that, without limitation to the measurement method, other measurement methods may be employed.

The queue amount inference unit 51 infers a queue amount (a packet amount remaining in the network 20) based on delay, a transmission rate, and the like when the delay measurement processing unit 41 has measured the delay or at preset certain time intervals. The delay is delay that is measured by the delay measurement processing unit 41. Further, the transmission rate is a transmission rate that is set by the transmission rate control unit 70. Here, when inferring the queue amount at the above certain time intervals, the queue amount inference unit 51 uses the delay that was measured by the delay measurement processing unit 41 immediately before the inference processing.

In the first exemplary embodiment, as a queue amount inference method by the queue amount inference unit 51, a method of calculating a queue amount (q) by the following formula 1 using delay (d), the minimum value of delay (d_min), and actual data transmission throughput (bw) is employed. The delay (d) is delay that is measured by the delay measurement processing unit 41. Further, the minimum value of delay (d_min) is delay within a certain time period or during the same transmission session that is performed storage and update processing by the delay measurement processing unit 41 in response to a command signal and the like from the minimum delay value control unit 81.

$$[\text{Formula 1}] \quad q = bw \times (d - d\_\min) \qquad (1)$$

Further, without limitation to the inference method by the above formula 1, for example, an inference method that uses a current transmission rate (cw) that is set by the transmission rate control unit 70, instead of the transmission throughput (bw), may be employed. Alternatively, an inference method using delay (d), instead of (d−d_min) in the above formula 1, may be employed.

The congestion detection unit 60 detects the degree of congestion in the network 20 based on a queue amount inferred by the queue amount inference unit 51 when the queue amount inference unit 51 has inferred the queue amount by or at preset certain time intervals. Here, when detecting the degree of congestion at the above-described certain time intervals, the congestion detection unit 60 uses the queue amount that was inferred by the queue amount inference unit 51 immediately before the detection processing.

The first exemplary embodiment employs, as a congestion detection method by the congestion detection unit 60, a method of detecting a congestion state when the queue amount (q) that was inferred by the queue amount inference unit 51 exceeds a preset threshold (th1).

Alternatively, a method of presetting a plurality of thresholds and detecting a congestion level based on between which thresholds the queue amount (q) that was inferred in real time falls into (a method of detecting the degree of congestion by levels) may be employed. Further, a method of detecting the degree of congestion (cn) by calculating using "cn=f(q)" as a function of a queue amount (q) that was inferred in real time may otherwise be employed.

The transmission rate control unit 70 controls, when the congestion detection unit 60 has detected the degree of congestion or at preset certain time intervals, a transmission rate (transmission speed) of data (a packet) that is being transmitted to the user terminal 30 based on the degree of congestion detected by the congestion detection unit 60. Here, when controlling a transmission rate at the above-described certain intervals, the transmission rate control unit 70 uses the degree of congestion that was detected by the congestion detection unit 60 immediately before the transmission rate control.

The first exemplary embodiment employs the following method as a transmission speed control method by the transmission rate control unit 70. When the congestion detection unit 60 has detected a congestion state, the transmission rate (cw) is reduced by a predefined numerical value. Whereas, when the congestion detection unit 60 has detected no congestion state, the transmission rate (cw) is increased by a predefined numerical value.

Further, a method that is added a control of not changing a transmission rate (cw) depending on the level of congestion to the above control method may be employed. That is, as described above, a method of, if the congestion detection unit 60 detects congestion in levels according to a preset plurality of thresholds, changing the variation amount of the transmission rate (cw) for each level of congestion, may be employed.

It should be appreciated that, a control method of controlling reduction of a transmission rate (cw) only when the congestion detection unit 60 has detected a congestion state and not changing a transmission rate (cw) when the congestion detection unit 60 has detected no congestion state, may be employed.

Further, in the above control method, a control method of using a preset ratio, instead of a preset numerical value that is used for increasing or decreasing a transmission rate (cw), may be employed. Further, for example, a method of calculating a new transmission rate (cw) based on the current transmission rate (cw), actual data transmission throughput (bw), and the degree of congestion (cn) detected by the congestion detection unit 60 may be employed.

The minimum delay value control unit 81 includes variation detection means 83 and minimum delay value alteration processing means 84. The variation detection means 83 detects a variation in the minimum delay value that was performed storage processing by the delay measurement processing unit 41 based on a variation pattern of delay measured by the delay measurement processing unit 41, a packet transmission interval of the data transmission device 11, and a packet reception interval of the user terminal 30 (variation determination information). The minimum delay value alteration processing means 84 performs alteration processing of the current minimum delay value when this variation detection means 83 has detected a variation in the minimum delay value.

The minimum delay value alteration processing means 84 includes a calculation function 84A and an update function 84B. The calculation function 84A calculates the increased minimum delay value when the variation detection means 83 has detected a variation in the minimum delay value. The update function 84B transmits a signal for updating the current minimum delay value with this calculated value to the delay measurement processing unit 41. "Minimum delay value alteration processing means" according to the minimum delay value alteration processing means 84 is simply called "alteration processing means".

Further, the minimum delay value alteration processing means 84 includes an initialization function 84C that, when the variation detection means 83 has detected a variation in the minimum delay value as a certain detection condition is satisfied, transmits a signal for initializing the current minimum delay value to a preset reference value (an initial value) to the delay measurement processing unit 41.

That is, when having detected a variation in the minimum delay value based on each piece of information that is performed storage processing by the delay measurement processing unit 41, the minimum delay value control unit 81 calculates a value of the varied minimum delay value and provides an instruction to the delay measurement processing unit 41 to update the current minimum delay value with the calculated value. Alternatively, the minimum delay value control unit 81 provides an instruction to the delay measurement processing unit 41 to initialize the current minimum delay value. Here, a variation in the minimum delay value indicates that the current minimum delay value is different from the actual minimum delay value.

The variation detection means 83 detects a variation in the minimum delay value by determining the variation based on the above-described variation determination information when the data transmission device 11 has received acknowledgement of data (a packet) that was transmitted to the user terminal 30 or at certain time intervals. Then, when the variation detection means 83 has detected a variation in the minimum delay value, the minimum delay value control unit 81, according to the condition for this detection, transmits whether a command signal for updating the minimum delay value with the varied minimum delay value that was calculated upon the detection or a command signal for initializing the minimum delay value to the delay measurement processing unit 41.

Then, as described above, the delay measurement processing unit 41 updates or initializes the minimum delay value according to the command signal that was transmitted by either function of the update function 84B or the initialization function 84C.

It should be noted that, in the first exemplary embodiment, before the minimum delay value control unit 81 performing a control relating to update or initialization, the minimum delay value (an initial value) that is used when the queue amount inference unit 51 calculates a queue amount is set by input from outside by an operator or the like. However, the initial value of the minimum delay value may be set by calculating by the delay measurement processing unit 41 or the minimum delay value control unit 81 based on chronologically measured delay.

Here, any of the following methods can be employed for update and the like of the above-described minimum delay value.

The first method is a method where the minimum delay value is updated when the packet transmission interval of the data transmission device 11 and the packet reception interval of the user terminal 30 that have been measured by the delay measurement processing unit 41 satisfy specific conditions.

Specifically, the above specific conditions can be expressed by the following formulas 2 to 4. In this case, time when a packet, of which packet transmission order is kth (k is arbitrary natural number), is transmitted from the data transmission device 11 (transmission time) is defined as Ts(k), time when the kth packet arrives the user terminal 30 (arrival time) is defined as Tr(k), and preset thresholds are defined as th2, th3, and th4.

[Formula 2] $\{Tr(k)-Tr(k-1)\}-\{Tr(k-1)-Tr(k-2)\} \geq th2$    (2)

[Formula 3] $\{Tr(k)-Tr(k-1)\}-\{Ts(k)-Ts(k-1)\} \leq th3$    (3)

[Formula 4] $Tr(k+1)-Tr(k) \geq th4$    (4)

Here, the formula 2 indicates that time obtained by subtracting "a difference of arrival times between the (k−2)th packet and the (k−1)th packet" from "a difference of arrival times between the (k−1)th packet and the kth packet" is not less than a threshold (th2). Further, the formula 3 indicates that time obtained by subtracting "a difference of transmission times between the kth packet and the (k−1)th packet" from "a difference of arrival times between the (k−1)th packet and the kth packet" is not less than a threshold (th3). Further, the formula 4 indicates "a difference of arrival times between the kth packet and the (k+1)th packet" is not less than a threshold (th4).

That is, when all the conditions indicated by these three formulas are satisfied, the variation detection means 83 can determine that the specific conditions are satisfied (determination criteria of whether to update the minimum delay value) and employ an update method of transmitting a command signal for storing delay of the kth packet d_k as a new minimum delay value to the delay measurement processing unit 41. Transmitting the command signal for storing delay of the kth packet d_k as a new minimum delay value means giving an instruction to the delay measurement processing unit 41 to store delay of the kth packet d_k as a new minimum delay value.

In such a case, the following configuration is employed. The variation detection means 83 detects an increase in the minimum value of delay pertaining to packet transmission when "a packet transmission interval" and "a packet reception interval" with reference to an arbitrary packet (kth packet) satisfy preset specific conditions. Then, when the variation detection means 83 has performed the detection, the minimum delay value alteration processing means 84 gives an instruction, by the update function 84B, to the delay measurement processing unit 41 to store the delay pertaining to the arbitrary packet that was a reference when the above specific conditions are satisfied as a new minimum delay value.

In the second method, the minimum delay value alteration processing means 84 calculates the minimum value among measured delay values of packets within a certain time period or of a certain number of packets and performs storage processing of one or a plurality of past minimum values that have been chronologically calculated including the current value (the latest minimum value) in the internal memory and the like (not shown). Further, the minimum delay value alteration processing means 84 derives the minimum delay value using a known statistical method, such as a Kalman filter and an exponential moving average, to these plurality of minimum values that have been applied the storage processing. Then, in the second method, the minimum delay value alteration processing means 84 gives an instruction to the delay measurement processing unit 41 to store this derivation value as a new minimum delay value.

That is, the following configuration may be employed. When the variation detection means 83 has detected an increase in the minimum value of delay, the minimum delay value alteration processing means 84 chronologically performs storage processing of the minimum value among the measurement delay values of packets within a certain time period or of a certain number of packets. Then, the minimum delay value alteration processing means 84 derives the increased minimum delay value using a statistical method to at least two minimum values, including the latest value, that are selected from the data to which storage processing has been applied.

Further, the configuration may be as follows. The delay measurement processing unit 41 is equipped with a function of calculating the minimum value among measured delay values of packets within a certain time period or of a certain number of packets and a function of performing storage processing of one or a plurality of previous minimum values, including the current value (the latest minimum value), that have been chronologically calculated in the internal memory and the like (not shown). Then, the minimum delay value alteration processing means 84 calculates a new minimum delay value based on the stored data.

The third method is a method where the delay measurement processing unit 41 measures one way delay of acknowledgement (ACK packet) that is less susceptible to queue delay, and the variation detection means 83 detects possibility of an increase in the minimum delay value based on the variation of this measured one way delay. As such, in the third method, when the variation detection means 83 has detected an increase in the minimum delay value, the minimum delay value alteration processing means 84, by the initialization function 84C, gives an instruction to the delay measurement processing unit 41 to initialize the current minimum delay value to the preset reference value (initial value).

For example, if time when acknowledgement (ACK packet) corresponding to the kth packet is transmitted from the user terminal 30 is defined as Tas_k, and time when the acknowledgement arrives at the data transmission device 11 is defined as Tar_k, the one way delay OWD_k is calculated by the following formula 5.

[Formula 5] $OWD\_k = Tar\_k - Tas\_k$ (5)

[Formula 6] $OWD\_k > th5$ (6)

That is, the following configuration may be employed. The variation detection means 83 is equipped with a function of determining whether the one way delay OWD_k that was calculated by the delay measurement processing unit 41 is larger (increased larger) than a preset threshold th5 according to the above formula 6, a function of counting the number of times when this determination function determines that the one way delay as larger therethan, and a function of detecting an increase in the minimum delay value when this counted number exceeds an integer n of not less than one (increase criteria number n). Then, when the variation detection means 83 has detected an increase in the minimum delay value by these functions, the minimum delay value alteration processing means 84 gives an instruction, by the initialization function 84C, to the delay measurement processing unit 41 to initialize (reset) the current minimum delay value. Here, the above threshold th5 is a value that has been set in advance based on the average value or minimum value of delay that have been previously performed storage processing by the delay measurement processing unit 41.

Further, for example, as in the fourth to sixth methods indicated as follows, a method that accompanies a change in the packet transmission method of the data transmission device 11 may be employed.

The fourth method is the following update method. When transmitting of a packet at certain time intervals or per a certain number of packets, the data transmission device 11 transmits a specific packet (a priority packet) that is set at high priority so that the packet is preferentially transmitted at a network device on the route. Next, the data transmission device 11 causes the delay pertaining to the priority packet to be stored as a new minimum delay value.

In order to use such a method, the first exemplary embodiment of the present invention employs the following configuration. The transmission unit 90 is equipped with priority packet transmission means that selects a packet at certain time intervals or per a certain number of packets among packets to be transmitted, sets the priority of the selected packet high, and transmits the packet as a priority packet that is preferentially transferred in the network. Then, the delay pertaining to this priority packet is calculated by the minimum delay value alteration processing means 84 and used as a value of the increased minimum delay value.

In such a case, when the data transmission device 11 has received acknowledgement corresponding to the priority packet, the minimum delay value alteration processing means 84 gives an instruction to the delay measurement processing unit 41 to store the delay of the priority packet as a new minimum delay value.

In the first exemplary embodiment, as the method of setting the priority high, a method of transmitting a packet by setting an emergency flag in the header information is employed. However, other than such a method, a method of transmitting a packet as a highly prioritized class, such as a sound class, may be employed.

The fifth method is the following update method. When transmitting a packet at predetermined time intervals or per a certain number of packets, the data transmission device 11 transmits the packet after waiting a preset certain time such that there is no queue remaining (remaining packet) in a network device on the route. Next, the data transmission device 11 causes the delay of a packet immediately after waiting to be stored as a new minimum delay value.

In order to use such a method, the first exemplary embodiment of the present invention employs the following configuration. The transmission unit 90 is equipped with wait control transmission means that suspends packet transmission at certain time intervals or per a certain number of packets and resumes the packet transmission after preset wait time has elapsed. Then, the minimum delay value alteration processing means 84 calculates the delay of a packet that was transmitted immediately after the wait time and uses the delay of the packet as the value of the increased minimum delay value.

In such a case, when the data transmission device 11 has received acknowledgement corresponding to a packet that was transmitted after waiting, the minimum delay value alteration processing means 84 gives an instruction to the delay measurement processing unit 41 to store the delay of the packet as a new minimum delay value.

The sixth method is the following update method. When transmitting packets, the data transmission device 11 transmits packets by changing the size of a packet that was selected at certain time intervals or per a certain number of packets to the size that is different from a preset size in normal time (a reference size). Then, the data transmission device 11 calculates a new minimum delay value by comparing the delay of the packet of which size has changed and the delay of a packet that was transmitted as a reference size and stores the new minimum delay value.

In order to use such a method, the first exemplary embodiment of the present invention employs the following configuration. The transmission unit 90 is further equipped with size change transmission means that selects a packet at certain time intervals or per a certain number of packets from packets to be transmitted and transmits the packet by changing the size of this selected packet to a preset size that is different from a size in normal time (a reference size). Then, the variation detection means 83 detects an increase in the minimum value of delay by comparing the delay of the packet of which size has changed and the delay of the packet that was transmitted as the reference size. Then, the minimum delay value alteration processing means 84 that acquired the detection result calculates the increased value of the minimum delay value.

In such a case, the following configuration is employed. When the data transmission device 11 has received acknowledgement corresponding to a packet of which size has changed as above, the variation detection means 83 that compared the delay of the packet and the delay of previous packets detects an increase in the minimum value of delay. Next, in response to this, the minimum delay value alteration processing means 84 derives a fixed delay that is not affected by queue delay and gives an instruction to the delay measurement processing unit 41 to store the fixed delay as a new minimum delay value.

Specifically, for example, a method of periodically comparing data transfer speed (br) that is calculated by the following formula 7 may be employed. Here, the size of a packet, of which size has been changed, and the delay pertaining to the transmission of such a packet are respectively defined as size_chg and d_chg, and the size of a packet that is transmitted as a reference size and the delay pertaining to the transmission of such a packet are respectively defined as size_def and d_def.

[Formula 7] $br=(size\_def-size\_chg)/(d\_def-d\_chg)$ (7)

When such a method is employed, the configuration becomes as follows. The variation detection means 83 is equipped with a function of periodically calculating data transfer speed (br) and a function of storing and updating the maximum value of the data transfer speed (br) based on the calculated value. At the same time, if the above periodically calculated values continue to fall below the maximum value of previous data transfer speed (br) (when a preset minimum value increase criterion is satisfied) for a certain time period or for a certain number of packets, the variation detection means 83 detects a variation in the minimum delay value. Next, in response to this, the minimum delay value alteration processing means 84 updates the minimum delay value.

Here, as described above, the data transmission device 11 can employ a configuration as follows. In this case, the data transmission device 11 includes a function of acquiring a data request message from the user terminal 30 via the network 20 that lies in-between and a function of transmitting the data corresponding to the request to the user terminal 30 with a transmission rate that is set by the transmission rate control unit 70.

For example, if an origin server is employed as the data transmission device 11, as the origin server keeps all original data by itself, data can be transmitted with a set transmission rate.

Further, if a relay server device or a data communication device is employed as the data transmission device 11, the configuration can be as follows. The data transmission device 11 duplicates the original data as cache in the storage region of its own and retains a data stream that is transmitted from the origin server using the storage region of its own as a temporary buffer. As such, the data transmission device 11 transmits data with a set transmission rate without depending on network throughput (a data amount that can be processed within a certain time) between the origin server and the data transmission device 11.

Further, as a method of acquiring a data request message from the user terminal 30 when a relay server device or a data communication device is employed as the data transmission device 11, the following method can be employed. For example, the request message that is transmitted from the user terminal 30 to the origin server is transferred by a router or the like to the data transmission device 11, instead of the origin server, according to the condition of the header information and the like of the request message. Here, the router or the like is a router or the like that is installed in the middle of a path from the user terminal 30 to the origin server and connected to the data transmission device 11.

Further, without limitation to the above-described acquisition method, other methods including the following method may also be employed. For example, the user terminal 30 transmits a data request message by clearly specifying the data transmission device 11 as a proxy (a proxy server). Alternatively, when a DNS (Domain Name System) or the like performs address resolution of a destination address so that the user terminal 30 can transmit the data request message to the origin server, the DNS or the like replies the address of the data transmission device 11 instead of the origin server.

(Operation Description)

Next, the operation of the data transmission device 11 shown in FIG. 1 will be described with reference to the flowcharts shown in FIGS. 2 to 4. First, with reference to FIGS. 1 and 2, the operation contents from the network delay measurement processing until data transmission rate control by the data transmission device 11 will be described.

When the delay measurement processing unit 11 has received the acknowledgement corresponding to data (a data packet) that was transmitted to the user terminal 30, the delay measurement processing unit 41 measures delay that has occurred in transmission and reception of a packet in the network 20 and performs storage processing of the acquired delay data in the internal memory or the like (not shown). In addition, the delay measurement processing unit 41 stores the minimum value of the delay of a packet that is transmitted at certain time intervals or per a certain number of packets as the minimum delay value as necessary (FIG. 2: S201).

Subsequently, when the delay measurement processing unit 41 has measured the delay, the queue amount inference unit 51 infers a queue amount that indicates a packet amount that remains in the network 20 based on the delay measured by the delay measurement processing unit 41, a transmission rate that is set by the transmission rate control unit 70, and the like. In the first exemplary embodiment, the queue amount inference unit 51 infers the queue amount based on the above formula 1 (FIG. 2: S202).

Subsequently, when the queue amount inference unit 51 has inferred the queue amount, the congestion detection unit 60 detects the degree of congestion in the network 20 based on the inferred queue amount (FIG. 2: S203).

In the first exemplary embodiment, the congestion detection unit 60 detects a congestion state when the queue amount that was inferred in real time exceeds a preset threshold (th1). On the other hand, the congestion detection unit 60 detects no congestion state when the queue amount that was inferred in real time does not exceed the preset threshold (FIG. 2: S203).

Figure 2:
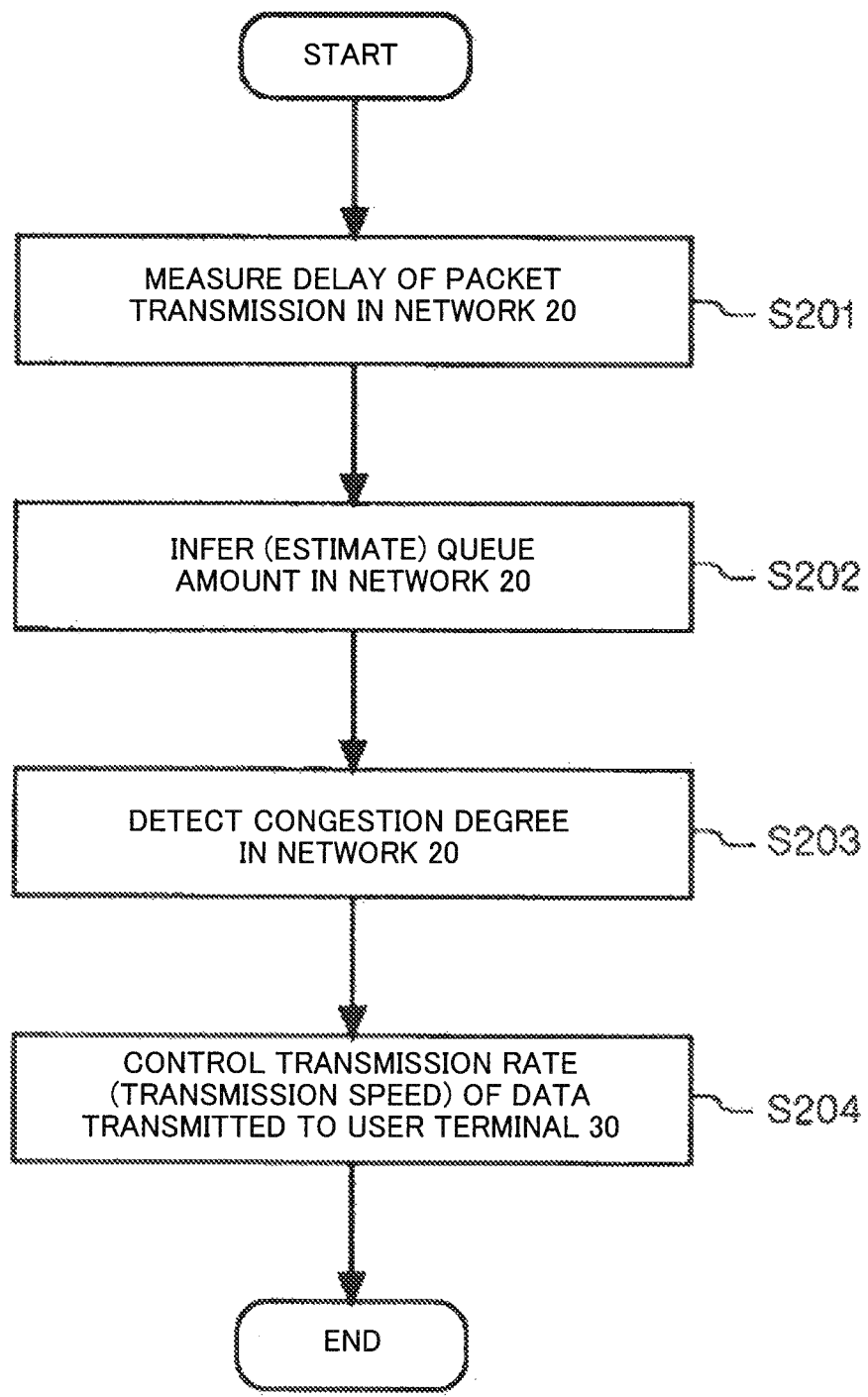
FIG. 2 is a flowchart showing operation from network delay measurement processing until data transmission rate control by the data transmission device disclosed in FIG. 1.

When the congestion detection unit 60 has detected the degree of congestion, the transmission rate control unit 70 controls the transmission rate (transmission speed) of data that is being transmitted to the user terminal 30 based on the degree of congestion that was detected by the congestion detection unit 60 (FIG. 2: S204).

In the first exemplary embodiment, when the congestion detection unit 60 detected a congestion state, the transmission rate control unit 70 decreases the transmission rate by a preset numerical value. Whereas, when the congestion detection unit 60 detected no congestion state, the transmission rate control unit 70 increases the transmission rate by a preset numerical value (FIG. 2: S204).

Here, the delay measurement processing by the delay measurement processing unit 41 as described above (FIG. 2: S201) may be performed at preset certain time intervals.

Similarly, the queue amount inference processing by the queue amount inference unit 51 (FIG. 2: S202) may be performed at preset certain time intervals. In such a case, the queue amount inference unit 51 uses delay that was measured and applied storage-processing by the delay measurement processing unit 41 immediately before the inference processing.

Likewise, the detection of the degree of congestion by the congestion detection unit 60 (FIG. 2: S203) may be performed at preset certain time intervals. In such a case, the congestion detection unit 60 uses a queue amount that was acquired by the queue amount inference unit 51 in the inference processing immediately before the detection.

Similarly, the control of a transmission rate by the transmission rate control unit 70 (FIG. 2: S204) may be performed at preset certain time intervals. In such a case, the transmission rate control unit 70 uses information of the degree of congestion that was detected by the congestion detection unit 60 immediately before the transmission rate control.

Subsequently, with reference to FIGS. 1 and 3, the operation of update and the like of the minimum value of delay will be described.

First, when the data transmission device 11 has received acknowledgement corresponding to data (a data packet) that was transmitted to the user terminal 30, the delay measurement processing unit 41 measures delay of packet transmission in the network 20 and performs storage-processing of the acquired delay data in the internal memory and the like (not shown). In addition, the delay measurement processing unit 41 stores the minimum value of delay of the packet that is transmitted at certain time intervals or per a certain number of packets as the minimum delay value as necessary (FIG. 3: S301).

Figure 3:
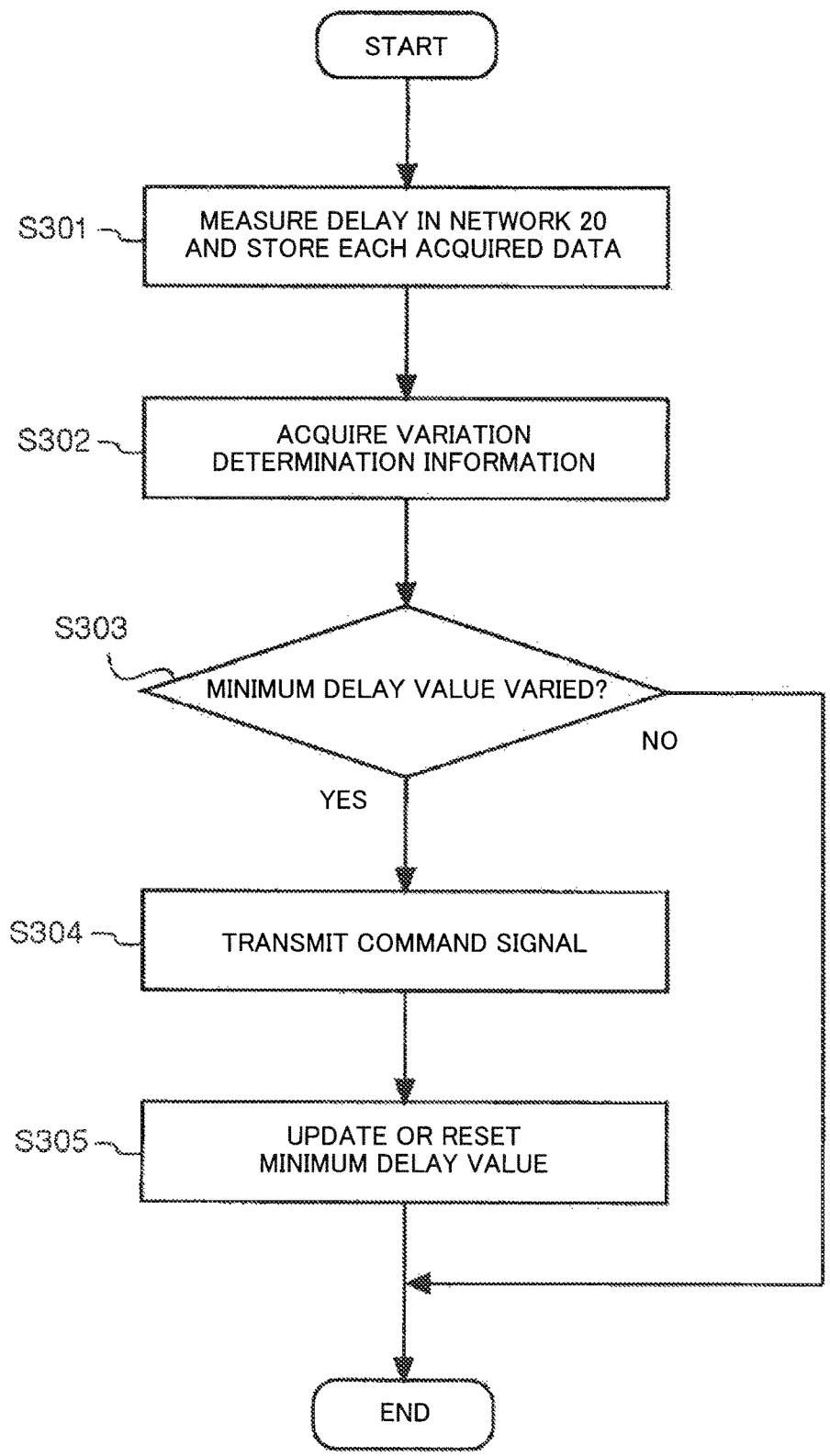
FIG. 3 is a flowchart showing operation pertaining to initialization or update of the minimum value of delay by the data transmission device disclosed in FIG. 1.

Next, when the data transmission device 11 has received acknowledgement corresponding to data that was transmitted to the user terminal 30, the variation detection means 83 acquires variation determination information that was performed storage processing by the delay measurement processing unit 41 (FIG. 3: S302). Here, the variation determination information is a variation pattern of delay, a packet transmission interval of the data transmission device 11, and a packet reception interval of the user terminal 30.

Subsequently, based on the acquired variation determination information, the variation detection means 83 determines whether the minimum delay value that was performed storage processing by the delay measurement processing unit 41 has varied (FIG. 3: S303).

Here, if the variation detection means 83 has detected a variation in the minimum delay value by determining that the minimum delay value has varied (FIG. 3: S303/Yes), the minimum delay value alteration processing means 84 calculates the varied minimum delay value by the calculation function 84A, and either transmits a first command signal or transmits a second command signal to the delay measurement processing unit 41 (FIG. 3: S304). Here, the first command signal is a command signal for updating the minimum delay value with the calculated value by the update function 84B. The second command signal is a command signal for initializing the minimum delay value by the initialization function 84C.

When having received the command signal from the minimum delay value alteration processing means 84, the delay measurement processing unit 41 performs update or initialization of the minimum delay value accordingly (FIG. 3: S305).

Whereas, if the variation detection means 83 determines that there is no variation in the minimum delay value (FIG. 3: S303/No), the minimum delay value control unit 81 performs determination processing and the like of a subsequent data packet without transmitting a command signal.

Here, the delay measurement processing by the delay measurement processing unit 41 (FIG. 3: S301) may be performed at preset certain time intervals.

Similarly, determination of whether the minimum delay value has varied by the variation detection means 83 (FIG. 3: S303) may be performed at preset certain time intervals.

Further, in particular, when the above-described first method is employed, the variation detection means 83 determines whether or not the above specific condition is satisfied (FIG. 3: S303), and, when all the conditions indicated by the above formulas 2 to 4 are satisfied, the variation detection means 83 detects a variation in the minimum delay value (FIG. 3: S303/Yes). Next, having received the detection result, the minimum delay value alteration processing means 84 calculates the varied minimum delay value by the calculation function 84A and transmits, by the update function 84B, a command signal for updating the minimum delay value with the calculated value to the delay measurement processing unit 41 (FIG. 3: S304). The delay measurement processing unit 41 updates the minimum delay value according to the command signal from the update function 84B (FIG. 3: S305).

Subsequently, with reference to FIGS. 1 and 4, the operation of initialization (reset) of the minimum value of delay will be described. Here, in particular, the operation content of the above-described second method will be described.

Figure 4:
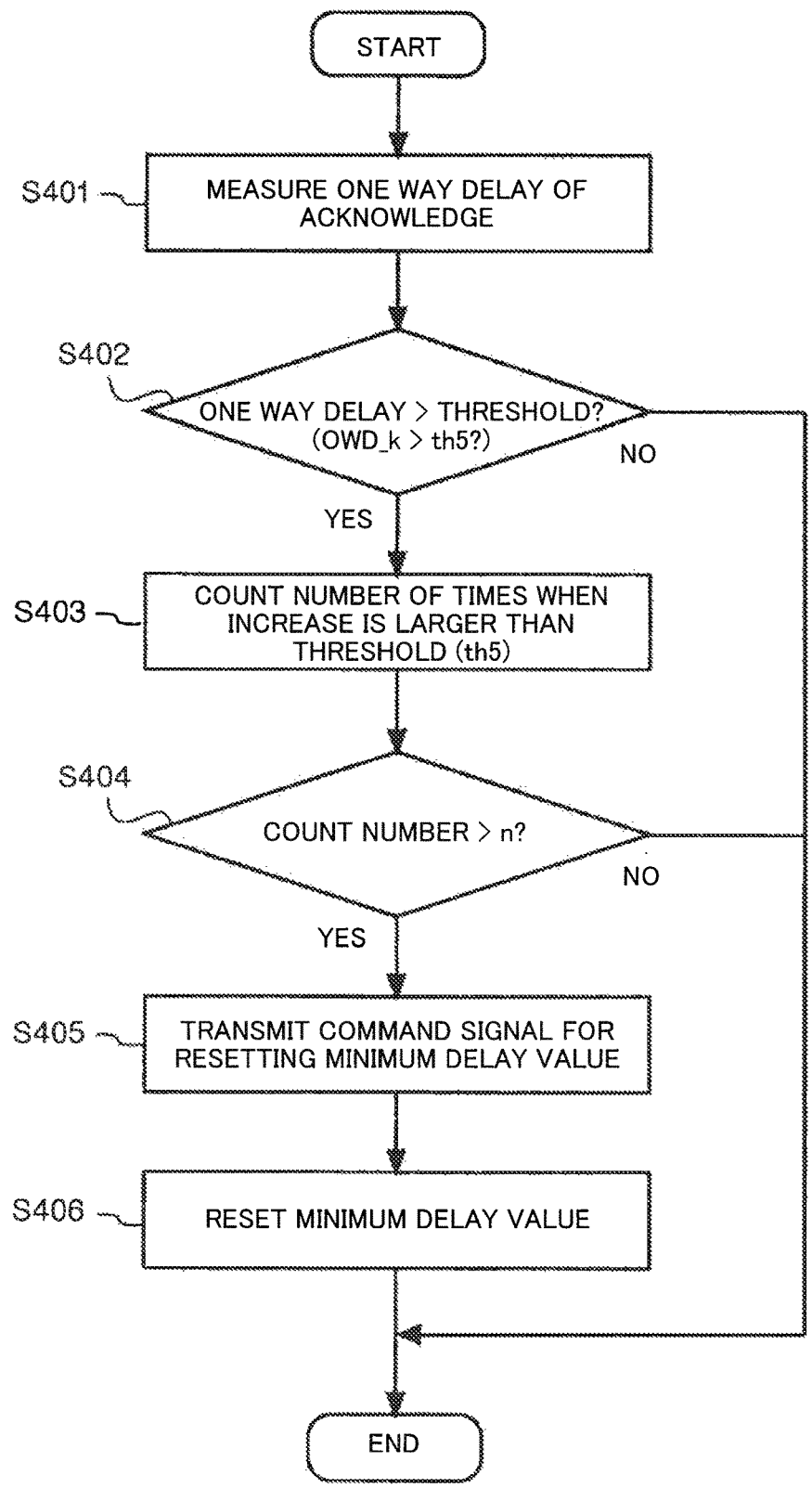
FIG. 4 is a flowchart showing operation pertaining to initialization (reset) of the minimum value of delay by the data transmission device disclosed in FIG. 1.

First, when having received acknowledgement, the delay measurement processing unit 41 measures the one way delay of the acknowledgement according to the above formula 5 (FIG. 4: S401).

Next, having acquired the one way delay that was measured by the delay measurement processing unit 41, the variation detection means 83 determines whether or not the one way delay is larger (increased larger) than a preset threshold th5 according to the above formula 6 (FIG. 4: S402).

Here, having determined the one way delay as large (FIG. 4: S402/Yes) the variation detection means 83 increases (increments), by one, the count number that is the number of times when the one way delay exceeded the threshold th5 (FIG. 4; S403).

Next, when the increased count number is larger than a preset number of times n (increase criteria number n: an integer larger than one), the variation detection means 83 detects that the minimum delay value has increased (FIG. 4: S404/Yes).

Receiving the detected result, the minimum delay value alteration processing means 84 transmits, by the initialization function 84C, a command signal for initializing the minimum delay value to the delay measurement processing unit 41 (FIG. 4: S405). Next, having received the command signal, the delay measurement processing unit 41 performs preset initialization of the minimum delay value (FIG. 4: S406).

On the other hand, if the delay measurement processing unit 41 has determined that the acquired one way delay is smaller than the threshold th5 (FIG. 4: S402/No), the variation detection means 83 performs determination processing or the like of a subsequent data packet without transmitting a command signal. Further, if the count number is not more than a preset number of times n (FIG. 4: S404/No), the variation detection means 83 performs determination processing or the like of a subsequent data packet without transmitting a command signal.

Here, the above measurement of one way delay by the delay measurement processing unit 41 (FIG. 4: S401) may be performed at preset time intervals. In such a case, the delay measurement processing unit 41 uses information of acknowledgement that was received immediately before the measurement.

Further, the execution contents of the processes of the above-described respective steps S201-S204 (FIG. 2), S301-S305 (FIG. 3), S401-S406 (FIG. 4) may be made into a program and, further, the series of control programs may be realized by a computer.

(Effect of First Exemplary Embodiment)

In the data transmission device 11 according to the first exemplary embodiment, as described above, the minimum delay value control unit 81, having detected a variation in the minimum delay value (d_min), transmits a control signal pertaining to update or the like of the minimum delay value (d_min) to the delay measurement processing unit 41. The minimum delay value (d_min) is a minimum delay value (d_min) that the queue amount inference unit 51 uses upon calculating the queue amount (q).

Therefore, even if a physical band varies in a network, the queue amount inference unit 51 can calculate an appropriate queue amount (q) using the adjusted minimum delay value (d_min) that was acquired from the delay measurement processing unit 41. Then, based on this calculated queue amount (q), the congestion detection unit 60 can detect the degree of congestion with high precision. As such, inconvenience where the transmission rate control unit 70 unnecessarily decreases a transmission rate can be suppressed, achieving improvement of throughput.

That is, according to the data transmission device 11, since erroneous detection of congestion can be prevented by an effective traffic control regardless of a frequent variation of a physical band in a network, effective improvement of transmission efficiency can be achieved.

Second Exemplary Embodiment

Next, a data transmission device according to the second exemplary embodiment of the present invention will be described with reference to FIGS. 5 and 6. In the second exemplary embodiment, the same components as the above-described first exemplary embodiment will be appended the same signs.

(Overall Configuration)

Here, the structure and components that are different from those of the above-described first exemplary embodiment will be described with reference to FIG. 5.

The data transmission device 12 according to the second exemplary embodiment includes a minimum delay value control unit 82, instead of the minimum delay value control unit 81 of the above-described first exemplary embodiment. The minimum delay value control unit 82 includes variation detection means 83 as the same components as the first exemplary embodiment and queue amount alteration processing means 85. The queue amount alteration processing means 85 gives an instruction to the queue amount inference unit 52 to calibrate a queue amount when the variation detection means 83 has detected a variation in the current minimum delay value that was performed storage and update processing by the delay measurement processing unit 42.

That is, the queue amount alteration processing means 85 includes a calculation function 84A in the same way as the minimum delay value alteration processing means 84 of the above-described first exemplary embodiment and a calibration function 85A. The calibration function 85A transmits a command signal to the queue amount inference unit 52 for calibrating the queue amount, in place of the update function 84B and initialization function 84C of the minimum delay value alteration processing means 84.

Therefore, a method of calculating a varied minimum delay value by the calculation function 84A of the queue amount alteration processing means 85 is the same as the method described in the above first exemplary embodiment.

Further, in addition to the function provided in the queue amount inference unit 51 of the above-described first exemplary embodiment, the queue amount inference unit 52 further includes a function of calibrating the inferred queue amount according to an instruction from the calibration function 85A of the queue amount alteration processing means 85.

That is, the configuration is as follows. The variation detection means 83 detects a variation in the minimum delay value (d_min) based on the variation determination information when the data transmission device 12 has received acknowledgement corresponding to a data packet that was transmitted to the user terminal 30 or at certain time intervals. Here, the variation determination information is a variation pattern of delay that is measured by the delay measurement processing unit 42, a packet transmission interval of the data transmission device 12, and a packet reception interval of the user terminal 30. Next, accordingly, the queue amount alteration processing means 85 calculates, by the calculation function 84A, the value of the varied minimum delay value by the above-described method and the like.

Further, the queue amount alteration processing means 85, by the calibration function 85A, compares the values of the minimum delay value before and after a variation, calculates a calibrated queue amount (a queue calibration amount q_r), and gives an instruction to the queue amount inference unit 52 to calibrate the queue amount in accordance with this queue calibration amount q_r.

As the calculation method of a queue calibration amount q_r, for example, a method of calculating by the following formula 7 can be employed; and, in the second exemplary embodiment, the calibration function 85A calculates the queue calibration amount q_r by such a method. Here, the current minimum delay value that was performed storage and update processing by the delay measurement processing unit 42 is defined as d_min_m, the value of a varied minimum delay value that was calculated by the calculation function 84A is defined as d_min_r, and actual data transmission throughput is defined as bw.

[Formula 8] $\quad q\_r = bw \times (d\_min\_r - d\_min\_m) \quad (8)$

Further, the queue amount alteration processing means 85 transmits, by the calibration function 85A, a command signal for subtracting the queue calibration amount q_r that was calculated as above from the current queue amount to the queue amount inference unit 52 and, according to the command signal, the queue amount inference unit 52 calibrates (subtracts) the inferred value of the queue amount.

In this way, the congestion detection unit 60 can precisely detect the degree of congestion in the network 20 based on the calibrated (subtracted) queue amount.

Here, for calibrating the queue amount, for example, other method, such as the following method may be used. Instead of the transmission throughput bw of the above formula 7, the current transmission rate cw that is set by the transmission rate control unit 70 is employed. At the same time, the queue amount alteration processing means 85 calculates the queue calibration amount q_r by the calibration function 85A according to the formula and gives an instruction based on the calculated value to the queue amount inference unit 52.

(Operation Description)

Next, the operation content of the data transmission device 12 shown in FIG. 5 will be described.

Here, the operation content from the network delay measurement processing until data transmission rate control by the data transmission device 12 is the same as the operation content (FIG. 2: S201-S204) of the data transmission device 11 (FIG. 1) described with reference to FIG. 2 in the first exemplary embodiment.

Figure 6:
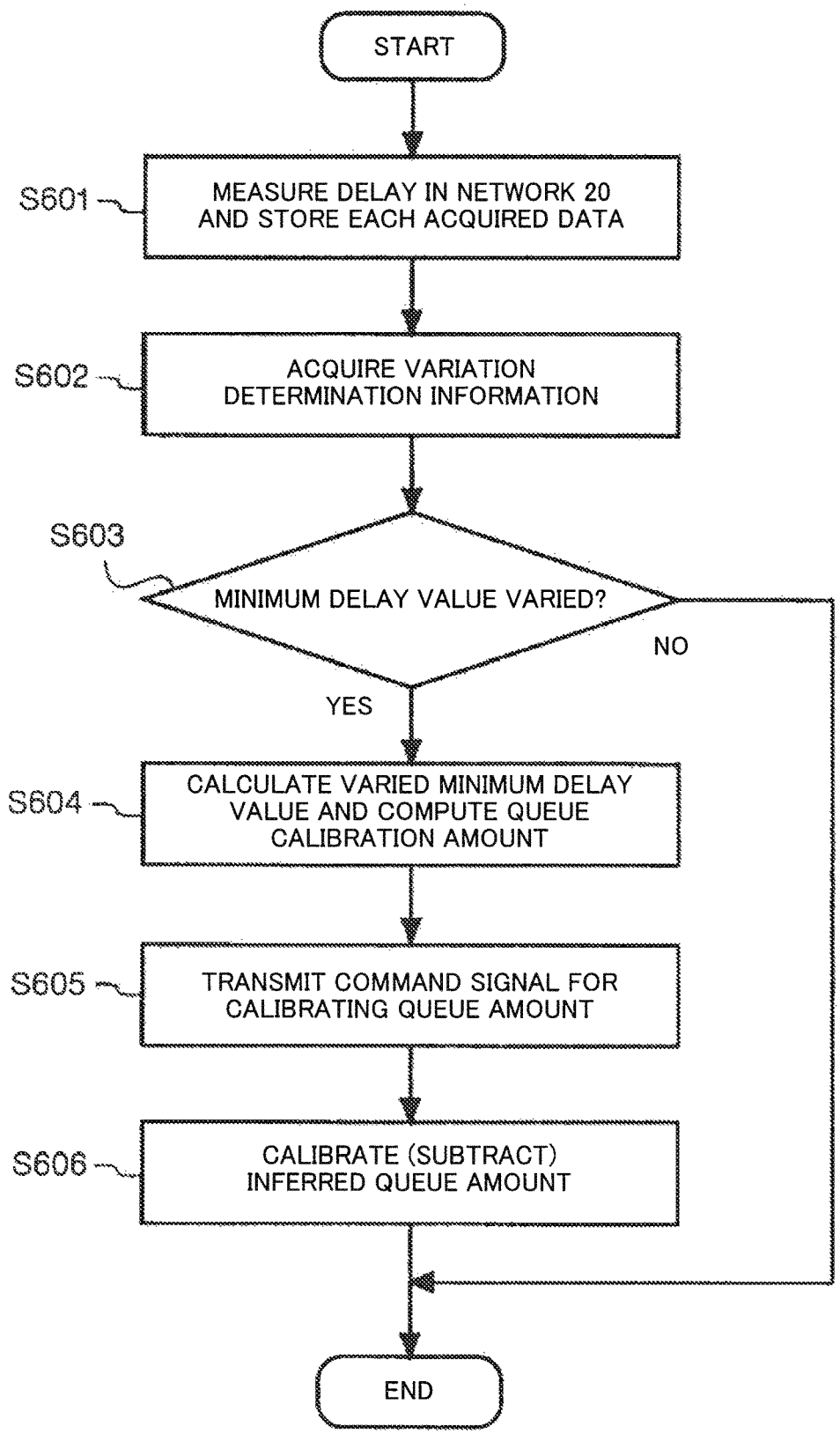
FIG. 6 is a flowchart showing operation pertaining to calibration of a queue amount by the data transmission device disclosed in FIG. 5.

Thus, the following will describe the operation content of calibrating the queue amount by the data transmission device 12 based on the flowchart shown in FIG. 6.

First, when the data transmission device 12 has received acknowledgement corresponding to data that was transmitted to the user terminal 30, the delay measurement processing unit 42 measures the delay of packet transmission in the network 20 and performs storage processing of the acquired delay data in the internal memory or the like (not shown). In addition, the delay measurement processing unit 42 stores the minimum value of delay pertaining to a packet transmitted at certain time intervals or per a certain number of packets as the minimum delay value as necessary (FIG. 6: S601).

Next, when the data transmission device 11 has received acknowledgement corresponding to data transmitted to the user terminal 30, the variation detection means 83 of the minimum delay value control unit 82 acquires variation determination information that was performed storage processing by the delay measurement processing unit 42 (FIG. 6: S602).

Subsequently, based on the acquired variation determination information, the variation detection means 83 determines whether the minimum delay value that was performed storage processing by the delay measurement processing unit 42 has varied (FIG. 6: S606).

Here, if the variation detection means 83 detects a variation in the minimum delay value by determining a variation in the minimum delay value (FIG. 6: S603/Yes), the queue amount alteration processing means 85, by the calculation function 84A and the calibration function 85A, calculates the varied minimum delay value and calculates the queue calibration amount based on the above formula 7 (FIG. 6: S604).

Next, the queue amount alteration processing means 85 transmits, by the calibration function 85A, a command signal to the queue amount inference unit 52 for subtracting the portion of the queue calibration amount that was calculated from the inferred queue amount (FIG. 6: S605)

The delay measurement processing unit 42, having received the command signal from the calibration function 85A, calibrates (subtracts) the inferred value of the queue amount accordingly (FIG. 6: S606).

On the other hand, if the variation detection means 83 determines that there is no variation in the minimum delay value (FIG. 6: S603/No), the minimum delay value control unit 82 performs determination processing and the like of a subsequent data packet without transmitting a command signal.

Here, the delay measurement processing by the delay measurement processing unit 42 (FIG. 6: S601) may be performed at preset certain time intervals.

Similarly, determination of whether the minimum delay value has been varied by the variation detection means 83 (FIG. 6: S603) may be performed at preset certain time intervals.

Further, the rest of the operation content is the same as the above-described first exemplary embodiment.

Further, the execution contents of the processes of the above respective steps S601-S606 (FIG. 6) may be made into a program and, further, the series of control programs may be realized by a computer.

(Effects of Second Exemplary Embodiment)

As described above, the data transmission device 12 of the second exemplary embodiment employs the following configuration. For calculation of a queue amount (q), if the variation detection means 83 has detected a variation in the minimum delay value (d_min) used by the queue amount inference unit 52, the queue amount alteration processing means 85 calculates the queue calibration amount (q_r) by comparing the minimum delay values before and after the variation. At the same time, the queue amount alteration processing means 85 transmits a command signal to the queue amount inference unit 52 for subtracting (calibrating) the calculated value (q_r) from the queue amount that was calculated in real time.

Therefore, even when a physical band varies in a network, the congestion detection unit 60 can precisely detect the degree of congestion based on the queue amount (q) that was adjusted by the queue amount inference unit 52 according to the command signal from the queue amount alteration processing means 85 (calibration function 85A). As such, inconvenience where the transmission rate control unit 70 unnecessarily decreases a transmission rate can be suppressed, achieving improvement of throughput.

That is, according to the data transmission device 12, since erroneous detection of congestion can be prevented by an effective traffic control regardless of a frequent variation of a physical band in a network, effective improvement of transmission efficiency can be achieved.

Third Exemplary Embodiment

Next, a data transmission device according to the third exemplary embodiment of the present invention will be described with reference to FIGS. 7 and 8.

As shown in FIG. 7, the data transmission device 110 includes a variation detection circuit 830 and an alteration processing circuit 840. The variation detection circuit 830 may be the variation detection means 83 indicated in FIG. 1. The alteration processing circuit 840 may be the minimum delay value alteration processing means 84 indicated in FIG. 1.

The data transmission device 110 transmits data to a user terminal (not shown) via a network (not shown) and controls transmission operation by correlating delay of a packet pertaining to this transmission with network information.

The variation detection circuit 830 detects an increase in a minimum value of the delay based on the delay and the network information.

The alteration processing circuit 840, when the variation detection circuit has detected the increase, calculates the increased minimum delay value and updates a current minimum delay value with this calculated value.

The respective components shown in FIG. 7 may be realized as respective circuits. The circuits may be a computer. Alternatively, the circuits may be LSI (Large Scale Integration) or PGA (Programmable Gate Array), and the LSI and PGA may be a single chip or a multichip. Further, the circuits may be a server or a combination of a server and a local device.

The components illustrated in FIG. 7 may be components divided into functional units of a computer device.

Next, a component of a hardware unit of the data transmission device 110 will be described.

FIG. 8 is a block diagram illustrating a hardware configuration of a computer 700 for implementing the data transmission device 110 according to this exemplary embodiment.

As illustrated in FIG. 8, the computer 700 includes a processor 701, a memory 702, a storage device 703, an input circuit 704, an output circuit 705, and a communication circuit 706. In addition, the computer 700 includes a recording medium (or a storage medium) 707 provided externally. The recording medium 707 may be a nonvolatile recording medium storing information non-temporarily.

The processor 701 controls the entire operation of the computer 700 by causing the operating system (not illustrated) to operate. In addition, the processor 701 loads a program or data from the recording medium 707 supplied to the storage device 703, for example, and writes the loaded program or data in the memory 702. Here, the program is, for example, a program for causing the computer 700 to perform the operations in the flowcharts presented in FIG. 2, FIG. 3, FIG. 4, and FIG. 6.

Then, the processor 701 carries out various processes as the variation detection circuit 830 and the alteration processing circuit 840 presented in FIG. 7, according to the loaded program or on the basis of the loaded data.

Alternatively, the processor 701 may be configured to download a program or data from an external computer (not illustrated) connected to a communication network (not illustrated), to the memory 702.

The memory 702 stores programs and data.

For example, the storage device 703 is an optical disc, a flexible disc, a magnetic optical disc, an external hard disk, or a semiconductor memory. The storage device 703 records programs and data.

The input circuit 704 is realized by a mouse, a keyboard, or a built-in key button, for example, and used for an input operation. The input circuit 704 is not limited to a mouse, a keyboard, or a built-in key button, it may be a touch panel, for example.

The output circuit 705 is realized by a display, for example, and is used in order to check output, for example.

The communication circuit 706 realizes communication with the user terminal.

As described above, the blocks serving as functional units of the data transmission device 110 illustrated in FIG. 1 may be implemented by the computer 700 having the hardware configuration illustrated in FIG. 8. However, means for implementing the units included in the computer 700 are not limited to those described above. In other words, the computer 700 may be implemented by a single physically-integrated device, or may be implemented by two or more physically-separated devices that are connected to each other with wire or by wireless.

Instead, the recording medium 707 with the codes of the above-described programs recorded therein may be provided to the computer 700, and the processor 701 may be configured to load and then execute the codes of the programs stored in the recording medium 707. Alternatively, the processor 701 may be configured to store the codes of each program stored in the recording medium 707, in the memory 702, the storage device 703, or both. In other words, this exemplary embodiment includes an exemplary embodiment of the recording medium 707 for storing programs (software) to be executed by the computer 700 (processor 701) in a transitory or non-transitory manner.

The above is the description of hardware about each component of the computer 700 which realizes the data transmission device 110.

(Effects of Third Exemplary Embodiment)

The data transmission device 110 can effectively improve throughput (transmission efficiency) even if a physical band frequently varies in a network.

The reason is that the data transmission device 110 can use the minimum delay value which is updated by the variation detection circuit 830 and the alteration processing circuit 840 for determining a transmission rate.

Figure 5:
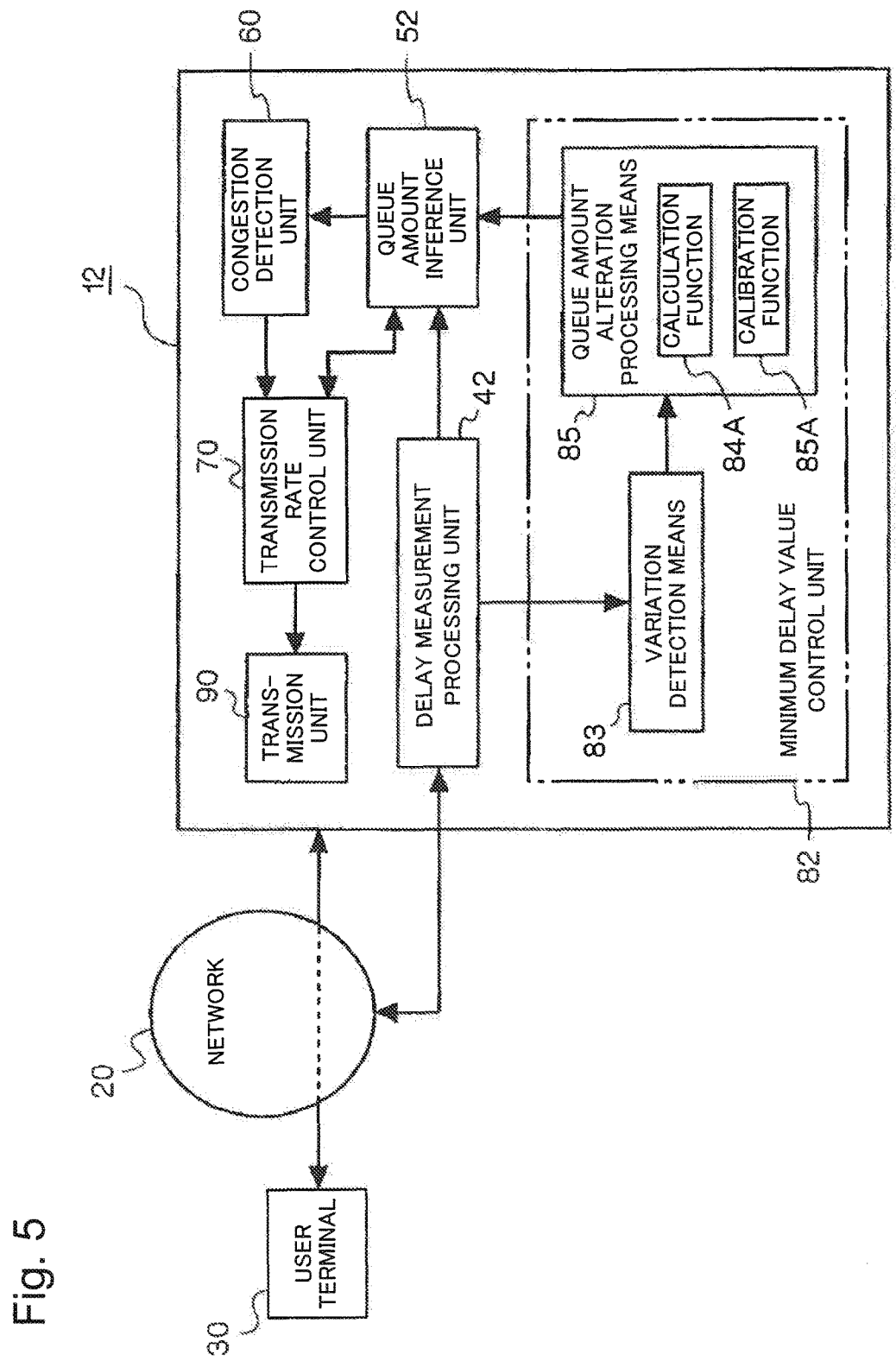
FIG. 5 is a block diagram showing a configuration of a data transmission device according to a second exemplary embodiment of the present invention and the surrounding environment.

Further, the respective components of the data transmission device 11 shown in FIG. 1 and the respective components of the data transmission device 12 shown in FIG. 5 may be realized as respective circuits that are described above.

Further, the respective components of the data transmission device 11 shown in FIG. 1 and the respective components of the data transmission device 12 shown in FIG. 5 may be components divided into functional units of the computer device.

It should be noted that the above-described exemplary embodiments are preferred specific examples of a data transmission device, a data transmission method and a program therefor, which may be with a variety of technically preferable limitations. However, the technical range of the present invention is not limited to these embodiments unless there is a particular description that restricts the present invention.

The following outlines the essential points of the novel technical contents of the above-described exemplary embodiments, while the present invention is not limited thereto.

(Supplementary Note 1)

A data transmission device that transmits data to a user terminal via a network and controls transmission operation by correlating delay of a packet pertaining to this transmission with network information, comprising:

a variation detection unit that detects an increase in a minimum value of said delay based on said delay and said network information; and an alteration processing unit that, when the variation detection unit has detected said increase, calculates said increased minimum delay value and updates a current minimum delay value with this calculated value.

(Supplementary Note 2)

The data transmission device according to Supplementary Note 1, wherein, for calculating the increased minimum delay value, the alteration processing unit uses data pertaining to a preset specific packet.

(Supplementary Note 3)

The data transmission device according to Supplementary Note 1 or 2, wherein said alteration processing unit, instead of updating with said calculated value, calibrates a queue amount that indicates a remaining packet amount in the network using said calculated value and current minimum delay value.

(Supplementary Note 4)

The data transmission device according to Supplementary Note 1 or 2, wherein when said variation detection unit has detected said increase, said alteration processing unit initializes said current minimum delay value to a preset reference value, instead of said calculation and update.

(Supplementary Note 5)

The data transmission device according to any one of Supplementary Notes 1 to 4, wherein said variation detection unit chronologically acquires one way delay of acknowledgement packets from said user terminal, counts the number of times when said measurement value is larger than a preset threshold, and detects said increase when this count number exceeds a preset increase criteria value.

(Supplementary Note 6)

The data transmission device according to any one of Supplementary Notes 1 to 3, wherein said variation detection unit detects said increase when a packet transmission interval and a packet reception interval with reference to an arbitrary packet satisfy preset specific conditions, and the alteration processing unit calculates delay pertaining to said arbitrary packet that was a reference when said specific conditions are satisfied as said increased minimum delay value.

(Supplementary Note 7)

The data transmission device according to any one of Supplementary Notes 1 to 3, further comprising:

a size change transmission unit that selects a packet at certain time intervals or per a certain number of packets from packets to be transmitted and transmits the packet by changing a size of this selected packet to a preset size that is different from a reference size, wherein the variation detection unit detects said increase by comparing delay pertaining to said packet of which size has changed and delay pertaining to a packet that was transmitted as said reference size.

(Supplementary Note 8)

The data transmission device according to any one of Supplementary Notes 1 to 3, further including:

a size change transmission unit that selects a packet at certain time intervals or per a certain number of packets from packets to be transmitted and transmits the packet by changing a size of this selected packet to a preset size that is different from a reference size, wherein the variation detection unit detects the increase when delay of the packet of which size has changed (and the size thereof) and delay of a packet that was transmitted as the reference size (and the size thereof) satisfy an associated minimum value increase criterion.

(Supplementary Note 9)

The data transmission device according to any one of Supplementary Notes 1 to 3, wherein said alteration processing unit chronologically performs storage processing of minimum values of measured values of said delay of packets within a certain time or of a certain number of packets and defines a value that was derived using a statistical method from at least two minimum values including a latest value selected from the data that was applied the storage processing as a calculated value of said increased minimum delay value.

(Supplementary Note 10)

The data transmission device according to any one of Supplementary Notes 1 to 3, wherein the alteration processing unit chronologically performs storage processing of minimum values of measured values of the delay of packets during a certain time or per a certain number of packets and defines a value that was derived using a statistical method from at least one of the minimum value selected from the data that was applied the storage processing and a current minimum delay value as a calculated value of the increased minimum delay value.

(Supplementary Note 11)

The data transmission device according to either Supplementary Note 9 or 10, wherein a Kalman Filter is used as the statistical method.

(Supplementary Note 12)

The data transmission device according to either Supplementary Note 9 or 10, wherein an exponential moving average is used as the statistical method.

(Supplementary Note 13)

The data transmission device according to any one of Supplementary Notes 1 to 3, further comprising:

a priority packet transmission unit that selects a packet at certain time intervals or per a certain number of packets among packets to be transmitted, sets priority of the selected packet high, and transmits the packet as a priority packet that is preferentially transferred in the network, wherein said alteration processing unit calculates delay pertaining to said priority packet as said increased minimum delay value.

(Supplementary Note 14)

The data transmission device according to any one of Supplementary Notes 1 to 3, further comprising:

a wait control transmission unit that suspends packet transmission at certain time intervals or per a certain number of packets and resumes the packet transmission after preset wait time has elapsed, wherein the alteration processing unit calculates delay of a packet that was transmitted immediately after said wait time as said increased minimum delay value.

(Supplementary Note 15)

A data transmission method of a data transmission device that transmits data to a user terminal via a network and controls transmission operation by correlating delay of a packet pertaining to this transmission with network information, the method comprising:

detecting an increase in a minimum value of said delay based on said delay and said network information;

in this detection, calculating said increased minimum delay value; and updating a current minimum delay value with this calculated value.

(Supplementary Note 16)

The data transmission method according to Supplementary Note 15, wherein after calculating said increased minimum delay value, instead of updating with said calculated value, calibrating a queue amount that indicates a remaining packet amount in said network using said calculated value and current minimum delay value.

(Supplementary Note 17)

The data transmission method according to Supplementary Note 15, wherein when said increase is detected, instead of said calculating and updating, initializing said current minimum delay value to a preset reference value.

(Supplementary Note 18)

A data transmission program, in a data transmission device that transmits data to a user terminal via a network and controls transmission operation by correlating delay of a packet pertaining to this transmission with network information, for causing a computer that is equipped in advance in said data transmission device to function as:

variation detection means for detecting an increase in a minimum value of said delay based on said delay and said network information;

calculation means for, when the variation detection means has detected said increase, calculating said increased minimum delay value; and update means for updating a current minimum delay value with the calculated value by the calculation means.

(Supplementary Note 19)

The data transmission program according to Supplementary Note 18, for causing said computer to function as:

instead of said update means, calibration means for calibrating a queue amount that indicates a remaining packet amount in said network using a calculated value by said calculation means and a current minimum delay value.

(Supplementary Note 20)

The data transmission program according to Supplementary Note 18, for causing said computer to function as:

when said variation detection means has detected said increase, instead of said calculation means and update means, initialization means for initializing said current minimum delay value to a preset reference value.

As mentioned above, although the present invention has been described with reference to the exemplary embodiments, the present invention is not limited to the abovementioned exemplary embodiments. Various changes which a person skilled in the art can understand in the scope of the present invention can be performed in a configuration and details of the present invention.

This application claims priority based on Japanese Patent Application No. 2013-088052 filed on Apr. 19, 2013, which application is incorporated herein in its entirety by disclosure.

INDUSTRIAL APPLICABILITY

The present invention can be applied to an inference device that infers a network state, such as a queue amount that remains in the network (a remaining packet amount), an available band, and a bit error rate, from delay. Further, the invention can be applied to a transmission rate control device that controls a transmission rate by simulating the like behavior of TCP in a protocol that is different from TCP, such as UDP (User Datagram Protocol).

REFERENCE SIGNS LIST 11, 12 DATA TRANSMISSION DEVICE
20 NETWORK
30 USER TERMINAL
41, 42 DELAY MEASUREMENT PROCESSING UNIT
51, 52 QUEUE AMOUNT INFERENCE UNIT
60 CONGESTION DETECTION UNIT
70 TRANSMISSION RATE CONTROL UNIT
81, 82 MINIMUM DELAY VALUE CONTROL UNIT
83 VARIATION DETECTION MEANS
84 MINIMUM DELAY VALUE ALTERATION PROCESSING MEANS
84A CALCULATION FUNCTION
84B UPDATE FUNCTION
84C INITIALIZATION FUNCTION
85 QUEUE AMOUNT ALTERATION PROCESSING MEANS
85A CALIBRATION FUNCTION
90 TRANSMISSION UNIT

What is claimed is:

1. A data transmission device that transmits data to a user terminal via a network and controls transmission operation by correlating delay of a packet pertaining to this transmission with network information, comprising:

a variation detection circuit that detects an increase in a minimum value of said delay based on said delay and said network information; and an alteration processing circuit that, when the variation detection circuit has detected said increase, calculates said increased minimum delay value and updates a current minimum delay value with said calculated increased minimum delay value, wherein the calculated increased minimum delay value is larger than the minimum delay value, and wherein said variation detection circuit chronologically acquires one way delay of acknowledgement packets from said user terminal, counts the number of times when a measurement value of said delayed packet is larger than a preset threshold, and detects said increase when this count number exceeds a preset increase criteria value.

2. The data transmission device according to claim 1, wherein said alteration processing circuit, instead of updating with said calculated increased minimum delay value, calibrates a queue amount that indicates a remaining packet amount in the network using said calculated increased minimum delay value and current minimum delay value.

3. The data transmission device according to claim 1, wherein, for calculating the calculated increased minimum delay value, the alteration processing circuit uses data pertaining to a preset specific packet.

4. The data transmission device according to claim 1, wherein when said variation detection circuit has detected said increase, said alteration processing circuit initializes said current minimum delay value to a preset reference value, instead of said calculation and update.

5. The data transmission device according to claim 1, wherein said variation detection circuit detects said increase when a packet transmission interval and a packet reception interval with reference to an arbitrary packet satisfy preset specific conditions, and the alteration processing circuit calculates delay pertaining to said arbitrary packet that was a reference when said specific conditions are satisfied as said increased minimum delay value.

6. The data transmission device according to claim 1, further comprising:

a transmission circuit that selects a packet at certain time intervals or per a certain number of packets from packets to be transmitted and transmits the packet by changing a size of this selected packet to a preset size that is different from a reference size, wherein the variation detection circuit detects said increase by comparing delay pertaining to said packet of which size has changed and delay pertaining to a packet that was transmitted as said reference size.

7. The data transmission device according to claim 1, further including:

a size change transmission circuit that selects a packet at certain time intervals or per a certain number of packets from packets to be transmitted and transmits the packet by changing a size of the selected packet to a preset size that is different from a reference size, wherein the variation detection circuit detects the increase when delay of the packet of which size has changed and delay of a packet that was transmitted as the reference size satisfy an associated minimum value increase criterion.

8. The data transmission device according to claim 1, wherein said alteration processing circuit chronologically performs storage processing of minimum values of measured values of said delay of packets within a certain time or of a certain number of packets and defines a value that was derived using a statistical method from at least two minimum values including a latest value selected from the data that was applied the storage processing as a calculated value of said increased minimum delay value.

9. The data transmission device according to either claim 8,
wherein a Kalman Filter is used as the statistical method.

10. The data transmission device according to claim 8,
wherein an exponential moving average is used as the statistical method.

11. The data transmission device according to claim 1,
wherein the alteration processing circuit chronologically performs storage processing of minimum values of measured values of the delay of packets during a certain time or per a certain number of packets and defines a value that was derived using a statistical method from at least one of the minimum value selected from the data that was applied the storage processing and a current minimum delay value as a calculated value of the increased minimum delay value.

12. The data transmission device according to claim 1, further comprising:
a transmission circuit that selects a packet at certain time intervals or per a certain number of packets among packets to be transmitted, sets priority of the selected packet high, and transmits the packet as a priority packet that is preferentially transferred in the network,
wherein said alteration processing circuit calculates delay pertaining to said priority packet as said increased minimum delay value.

13. The data transmission device according to claim 1, further comprising:
a transmission circuit that suspends packet transmission at certain time intervals or per a certain number of packets and resumes the packet transmission after preset wait time has elapsed,
wherein the alteration processing circuit calculates delay of a packet that was transmitted immediately after said wait time as said increased minimum delay value.

14. A data transmission method of a data transmission device that transmits data to a user terminal via a network and controls transmission operation by correlating delay of a packet pertaining to this transmission with network information, the method comprising:
detecting an increase in a minimum value of said delay based on said delay and said network information;
in this detection, calculating said increased minimum delay value; and
updating a current minimum delay value with said calculated increased minimum delay value,
wherein the calculated increased minimum delay value is larger than the minimum delay value, and
wherein the detecting operation chronologically acquires one way delay of acknowledgement packets from said user terminal, counts the number of times when a measurement value of said delayed packet is larger than a preset threshold, and detects said increase when this count number exceeds a preset increase criteria value.

15. The data transmission method according to claim 14, wherein
after calculating said increased minimum delay value, instead of updating with said calculated increased minimum delay value, calibrating a queue amount that indicates a remaining packet amount in said network using said calculated increased minimum delay value and current minimum delay value.

16. The data transmission method according to claim 14, wherein
when said increase is detected, instead of said calculating and updating, initializing said current minimum delay value to a preset reference value.

17. A non-transitory computer readable medium having stored thereon a data transmission program, in a data transmission device that transmits data to a user terminal via a network and controls transmission operation by correlating delay of a packet pertaining to this transmission with network information, for causing a computer that is equipped in advance in said data transmission device to function as:
variation detection means for detecting an increase in a minimum value of said delay based on said delay and said network information;
calculation means for, when the variation detection means has detected said increase, calculating said increased minimum delay value; and
update means for updating a current minimum delay value with the calculated increased minimum delay value by the calculation means,
wherein the calculated increased minimum delay value is larger than the minimum delay value, and
wherein said variation detection means chronologically acquires one way delay of acknowledgement packets from said user terminal, counts the number of times when a measurement value of said delayed packet is larger than a preset threshold, and detects said increase when this count number exceeds a preset increase criteria value.

18. The non-transitory computer readable medium according to claim 17, for causing said computer to function as:
instead of said update means, calibration means for calibrating a queue amount that indicates a remaining packet amount in said network using the calculated increased minimum delay value by said calculation means and the current minimum delay value.

19. The non-transitory computer readable medium according to claim 17, for causing said computer to function as:
when said variation detection means has detected said increase, instead of said calculation means and update means,
initialization means for initializing said current minimum delay value to a preset reference value.

* * * * *